(12) United States Patent
Oikawa et al.

(10) Patent No.: US 7,589,937 B2
(45) Date of Patent: Sep. 15, 2009

(54) THIN FILM MAGNETIC HEAD WITH HIGH FE ALLOY PLATING FILM AND MANUFACTURING METHOD THEREOF

(75) Inventors: Gen Oikawa, Odawara (JP); Kazue Kudo, Odawara (JP); Youji Maruyama, Iruma (JP); Noriyuki Saiki, Odawara (JP); Hiromi Shiina, Jyuou (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 460 days.

(21) Appl. No.: 10/894,723

(22) Filed: Jul. 19, 2004

(65) Prior Publication Data

US 2005/0036236 A1   Feb. 17, 2005

(30) Foreign Application Priority Data

Aug. 13, 2003   (JP)   ............................. 2003-207420

(51) Int. Cl.
G11B 5/127   (2006.01)
(52) U.S. Cl. ............................. 360/125.03; 360/125.54
(58) Field of Classification Search ................. 360/126, 360/125.03–125.75
See application file for complete search history.

(56) References Cited

U.S. PATENT DOCUMENTS

| | | | | |
|---|---|---|---|---|
| 6,063,512 A * | 5/2000 | Osaka et al. | ................. | 428/812 |
| 6,132,892 A * | 10/2000 | Yoshikawa et al. | ........... | 428/812 |
| 6,714,380 B2 | 3/2004 | Kawasaki et al. | | |
| 6,771,464 B2 * | 8/2004 | Minor | ......................... | 360/126 |
| 7,157,160 B2 * | 1/2007 | Miyake et al. | ............... | 428/812 |
| 7,163,755 B2 * | 1/2007 | Hiramoto et al. | .......... | 428/811.3 |
| 7,267,757 B2 * | 9/2007 | Kudo et al. | .................. | 205/596 |
| 2002/0131205 A1 * | 9/2002 | Gotoh et al. | ................. | 360/126 |
| 2002/0154443 A1 | 10/2002 | Kawasaki et al. | | |
| 2002/0155321 A1 * | 10/2002 | Kawasaki et al. | ........... | 428/692 |
| 2002/0163759 A1 * | 11/2002 | Kanada et al. | ............... | 360/126 |
| 2004/0080868 A1 * | 4/2004 | Yamaguchi et al. | .......... | 360/126 |

FOREIGN PATENT DOCUMENTS

| | | |
|---|---|---|
| JP | 10-008287 A | 1/1998 |
| JP | 11-195206 A | 7/1999 |
| JP | 2002-208109 | 7/2002 |
| JP | 2002-208514 | 7/2002 |
| JP | 2002-217029 | 8/2002 |
| JP | 2003-147575 A | 5/2003 |

* cited by examiner

*Primary Examiner*—Andrea L Wellington
*Assistant Examiner*—Adam B Dravininkas
(74) *Attorney, Agent, or Firm*—Townsend and Townsend and Crew LLP

(57) ABSTRACT

Embodiments of the invention provide a lustrous and uniform plating film having high-performance magnetic characteristics and a thin film magnetic head usable in a high frequency recording band by using the plating film of the invention at a magnetic pole portion. Plating is performed in a plating bath at a low pH of about 1.5 to 2.3. The accuracy of pH control is improved. A magnetic film with the addition of a high resistive metal such as Cr or Mo is formed under the plating condition. Further, the magnetic characteristic is improved by applying a heat treatment to the plating film in a magnetic field, according to specific embodiments of the present invention. A plating film with brightness and uniformity having high saturation magnetic flux density can be formed by reducing the hysteresis loss and the eddy current loss as the magnetic characteristics by the above techniques.

10 Claims, 8 Drawing Sheets

THIN FILM MAGNETIC HEAD WITH HIGH FE ALLOY PLATING FILM AND MANUFACTURING METHOD THEREOF

CROSS-REFERENCES TO RELATED APPLICATIONS

This application relates to and claims priority from Japanese Patent Application No. 2003-207420, filed Aug. 13, 2003, the content of which is hereby incorporated by reference into this application.

BACKGROUND OF THE INVENTION

The present invention relates to a thin film magnetic head mounted on a magnetic disk apparatus and used for reading/writing data, a manufacturing method thereof, and a magnetic disk apparatus using the thin film magnetic head. More specifically, the invention relates to a magnetic pole-forming technique for improving the recording characteristics of a thin film magnetic head with regard to the material and manufacturing method thereof.

Higher data communication speed and higher recording density have been demanded for magnetic disk apparatuses. To meet this demand, a recording medium is needed that has a high coercivity, as is a thin film magnetic head capable of recording at a higher frequency applicable to higher speed communication, using a material of low coercivity in the direction of difficult magnetization of the axis (hereinafter referred to as Hc) or a low anisotropic magnetic field (hereinafter referred to as Hk), in view of the requirement for reducing hysteresis in the magnetic poles. Further, a material of high specific resistivity (hereinafter referred to as ρ) has been needed in view of the requirement for reducing an eddy current loss. Further, recording characteristics for the high coercive medium have been improved to attain high recording density using a material having high-saturation magnetic flux density (hereinafter referred to as Bs).

Heretofore the magnetic pole, 52-58 wt % FeNi series alloy plating (Hk 5 to 10 Oe, Bs 1.65 to 1.75 T) having low Hc (1.0 to 1.5 Oe) and high ρ (40 to 50 μΩ cm) was used for the core portion, and a CoNiFe series alloy plating (Hc 10 to 25 Oe, Hk 15 to 25 Oe, ρ 15 to 20 μΩ cm) having high Bs (2.0 to 2.4 T) was used near the gap. For the high Bs material, it has been reported that Bs was 2.0T or more in the CoNiFe series in JP-A No. 2002-217029 and in the NiFe series alloy plating in JP-A No. 2002-208514 and this was already known in view of presentation and products from manufacturers of thin film magnetic heads.

For further higher speed and high recording density of magnetic disk apparatuses, materials capable of further reducing the hysteresis loss and the eddy current loss in the high-frequency recording band and having high Bs characteristics have to be used for the magnetic pole portion of the thin film magnetic head.

Further, the magnetic pole portion generates heat during recording operation, that is, during generation of the magnetic recording fields of the thin film magnetic head due to the hysteresis loss and the eddy current loss. The heat generation involves a problem of thermal protrusion. The magnetic pole portion expands thermally protruding in the direction of a recording medium or further, causing a collision due to heat generation. This problem hinders the low flying height of the thin film magnetic head, which is a focal subject of hindering higher speed and higher recording density of magnetic disk apparatuses.

As can be seen from the data described above, in the prior art, the 52-58 wt % FeNi series alloy plating material has the drawback of high Hk and small Bs despite the low Hc and high ρ, whereas the CoNiFe series alloy plating material has the drawback of high Hc, high Hk and low ρ although having high Bs. The FeNi series alloy has the merit of peaking at ρ40-50 μΩ cm in an Fe compositional region of 52 to 58 wt % and Bs increases while ρ lowers in a further Fe-rich region (range where Fe is 60 wt % or more). However, in Fe≧60 wt %, a problem arises causing whitening or blackening due to plating surface roughness, leading to the failure of the product.

On the other hand, for the CoNiFe series alloy, since the crystal structure has a bcc structure in most of compositional regions having Bs≧1.8 T, lowering of Hc due to the bcc structure is impossible. Although an fcc structure had been developed by modification of the composition, the phenomenon of surface roughness occurred as in the FeNi series alloy described above and development had to be given up. A thin film magnetic head capable of overcoming such a difficulty, as well as a manufacturing method thereof have not yet been provided.

BRIEF SUMMARY OF THE INVENTION

It is a feature of the present invention is to provide a high-performance thin film magnetic head and a manufacturing method thereof.

It is another feature of the present invention to provide a high-performance magnetic disk apparatus mounting the thin film magnetic head.

Embodiments of the present invention provide a way for plating in a bath at a low pH of about 1.5 to 2.3. A plating film obtained under these conditions exhibits a region of brightness and uniformity for the FeNi series alloy (Fe≧60 wt %), and exhibits brightness and uniformity in a compositional region where the Ni content in the bcc structure is restricted and the FeCo content in the fcc structure is increased, in the CoNiFe series alloy. A high-performance thin film magnetic head could be attained, for the first time, by selecting a film composition optimizing the magnetic characteristics with brightness and uniformity. Further, when plating film obtained according to embodiments of the invention is subjected to a heat treatment in a magnetic field, the magnetic characteristics are improved by the effect of recrystallization and the like. Further, in a case where the goal was to form a magnetic pole portion with importance being given to high ρ as the magnetic characteristic in view of the matching property in a recording medium, the goal could also be attained to realize a magnetic plating film with the addition of a nonmagnetic metal such as Cr or Mo, which heretofore had been impossible to obtain as products.

In the case of low pH plating according to embodiments of the present invention, degradation of composition/magnetic characteristics due to minute pH fluctuation and degradation of the uniformity of the film thickness are ruinous to the mass production of products, so that they should be sufficiently taken into consideration, for example, in plating electrolytic reaction and intrusion of aerial oxygen as fluctuation factors and capacity of a storage vessel causing buffer action. In embodiments of the present invention, pH measurement and automatic controlling method by a controlling liquid are performed and the capacity of the storage vessel is increased from existent 120 L to a larger 200 to 300 L, and nitrogen ($N_2$) purge under stirring is performed to attain high accuracy for pH control.

On the other hand, a thin film magnetic head of increased recording magnetic field and, further, decreased leak of magnetic field can be provided by partially forming the magnetic film ≦0.3 μm according to embodiments of the present invention only in the vicinity of a gap. Since the manufacturing method can moderate the dimensional accuracy compared with a wiring track width to the gap lower portion and a plating can be formed underlying the film at the magnetic pole end for the gap upper portion, it is possible to adopt a sputtering method capable of unifying characteristics and film thickness.

DETAILED DESCRIPTION OF THE INVENTION

A thin film magnetic head according to an embodiment of the present invention and a manufacturing method thereof are described below with reference to the drawings.

A five-inch diameter ceramic substrate was used and a stacked film Au/Cr=12/7 nm was formed as a plating conductive underlayer by a sputtering method. The plating bath temperature was 30±1° C., the bath composition was: 2.0 to 10 g/l of $Fe^{2+}$, 5 to 15 g/l of $Ni^{2+}$, 1.5±0.5 g/l of sodium saccharine, 25±5 g/l of boric acid, 25_±5 g/l of sodium chloride, and 250 L of a plating bath capacity in a storage vessel ($N_2$ purging by stirring) were used. In this case, the ratio of Fe ion concentration to Ni ion concentration in a plating bath is, preferably, defined as: Fe ion/Ni ion≧0.4.

A constant current power source was used for a plating power source and the applied current sequence could be set optionally by the unit of 1 sec and 1 mA by setting the time and the current value using a personal computer.

An X-ray fluorescence analysis apparatus was used to measure film thickness and film composition; a thin film B-H tracer was used to measure magnetic characteristics Hc, Hk and Bs, and a thin film resistance measuring apparatus was used to measure specific resistivity ρ.

Figure 1:
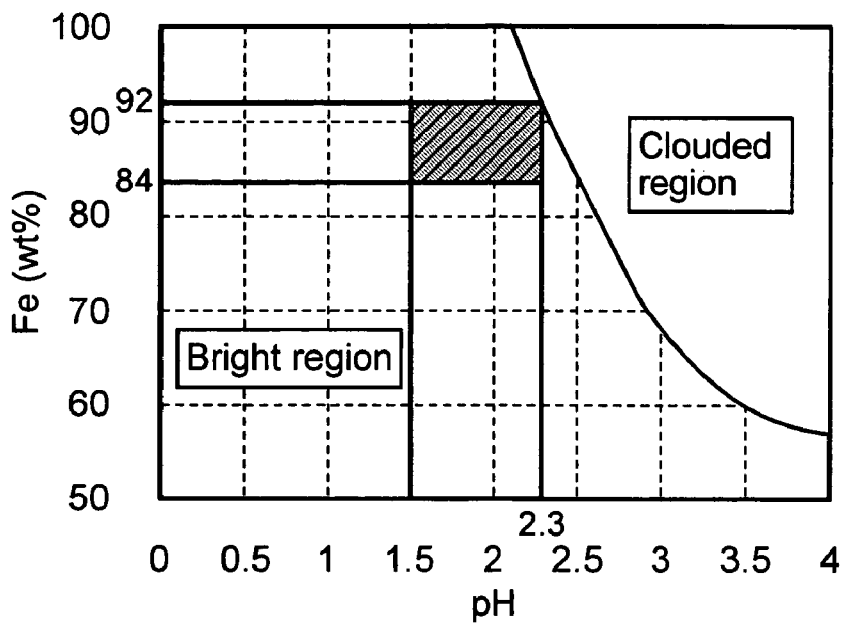
FIG. 1 is a diagram illustrating the dependence of a bright region on a plating bath pH in a FeNi alloy plating according to an embodiment of the present invention.

A first embodiment is now described. At first, pH dependence is shown in FIG. 1 as an essential condition for obtaining bright plating uniformly within a plane with respect to an FeNi alloy. In view of FIG. 1, it was found that even though the bright region at pH 3.5 is Fe≦60 wt % in a plating bath that was used, the bright region reached Fe=100 wt % at pH 2.2. From the result, it was found that a bright film could not be obtained at Fe≧70 wt % under the plating condition of pH 3.0 or more although the brightness region changed somewhat depending on the bath temperature, the bath concentration and the current density. It can be said that lowering of pH is a most effective technique.

Successively, dependence of the magnetic characteristic on the film composition (Fe content) is shown in FIGS. 2 to 5. As shown in each of the figures, magnetic characteristics of the film after plating and after heat treatment in the magnetic field were measured. The condition for the heat treatment in the magnetic field was at 250° C. for 3 hr in a vacuum, for which conditions during formation of coil insulation film were used after forming the magnetic pole end in the thin film magnetic head. That is, this temperature is the highest temperature in the heat treatment applied essentially in view of the process when the specific embodiment of the present invention is applied to the lower magnetic pole or the magnetic pole end. Further, since the deposition rate is lower as the pH is lower in this case, pH was set to 1.90±0.02 as a condition of increasing the deposition rate as much as possible and causing no clouding, in view of the mass production factor of the present invention. For the modification of the composition, a method of adding Fe from an existent composition of 54 wt % FeNi film to 95 wt % FeNi film was performed.

Figure 2:
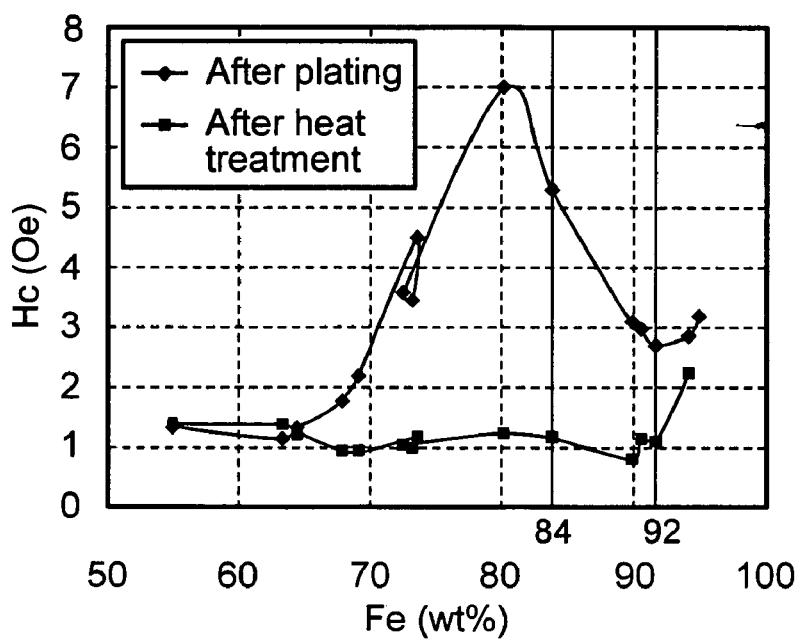
FIG. 2 is a diagram illustrating the dependence of a coercivity Hc on an Fe composition in an FeNi alloy plating according to an embodiment of the present invention.
Figure 3:
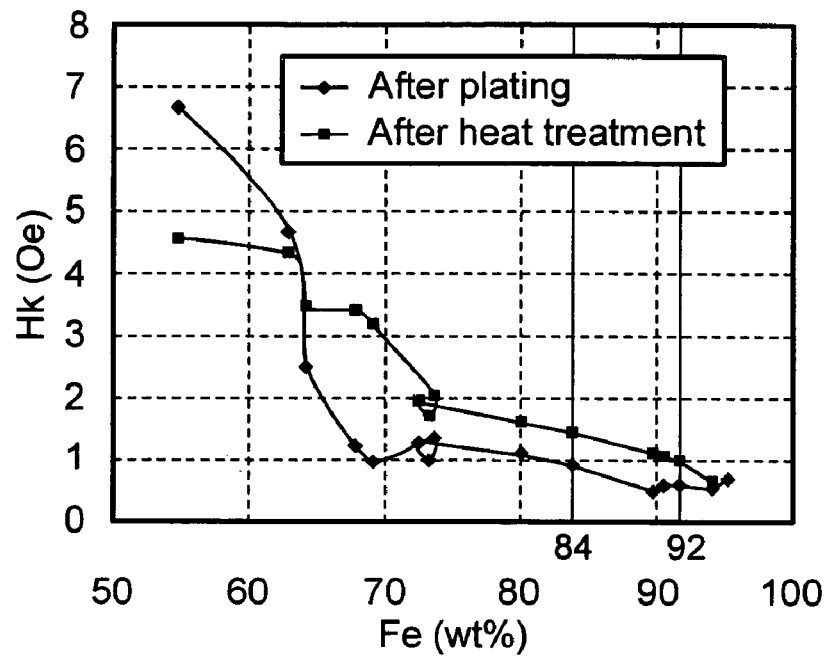
FIG. 3 is a diagram illustrating the dependence of an anisotropic magnetic field Hk on an Fe composition in an FeNi alloy plating according to an embodiment of the present invention.

The coercivity Hc shown in FIG. 2 has a peak of 7 (Oe) near Fe 80 wt %. It is lowered to 1.2 (Oe) by the application of a heat treatment and the peak tends to be extremely small. However, it was found that at Fe>92 wt %, the Hc reducing effect was insignificant and Hc was in a range exceeding 1.5 (Oe) even when the heat treatment was applied. Accordingly, it can be seen that the range of Fe≦92 wt % is necessary regarding coercivity Hc.

It was found that the anisotropic magnetic field Hk lowered along with an increase in Fe and it showed an identical trend after the heat treatment. However, Hk exceeds 1.5 (Oe) in a range of Fe<84 wt %. Accordingly, from the standpoint of the anisotropic magnetic field Hk, it can be seen that this is in a range of Fe≧84 wt %.

Figure 4:
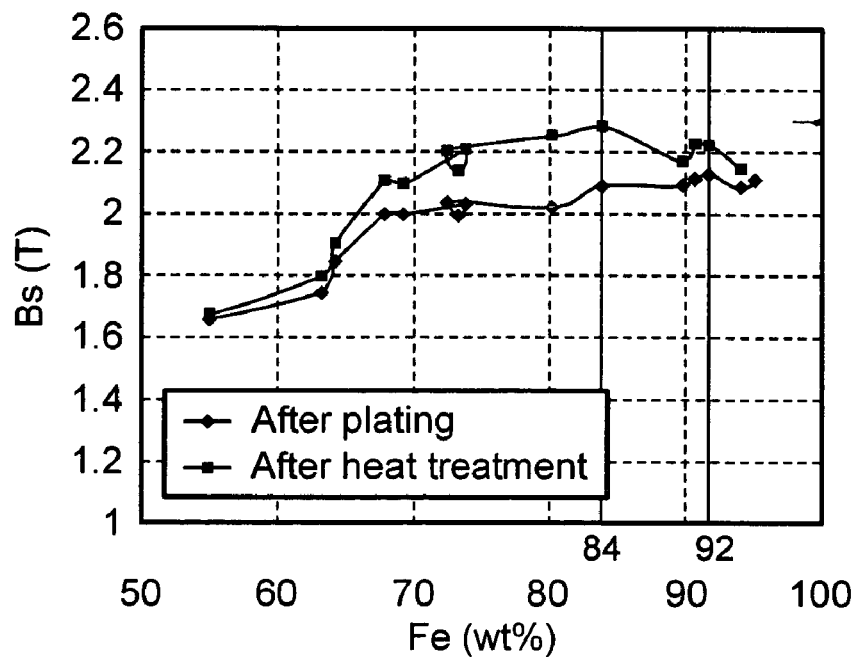
FIG. 4 is a diagram illustrating the dependence of a saturation magnetic flux density Bs on an Fe composition in an FeNi alloy plating according to an embodiment of the present invention.

It was found that the saturation magnetic flux density (Bs) shown in FIG. 4 increased along with an increase in Fe and did not depend on the Fe content at Fe≧75 wt %. Further, it was found that the trend was identical after the heat treatment.

Figure 5:
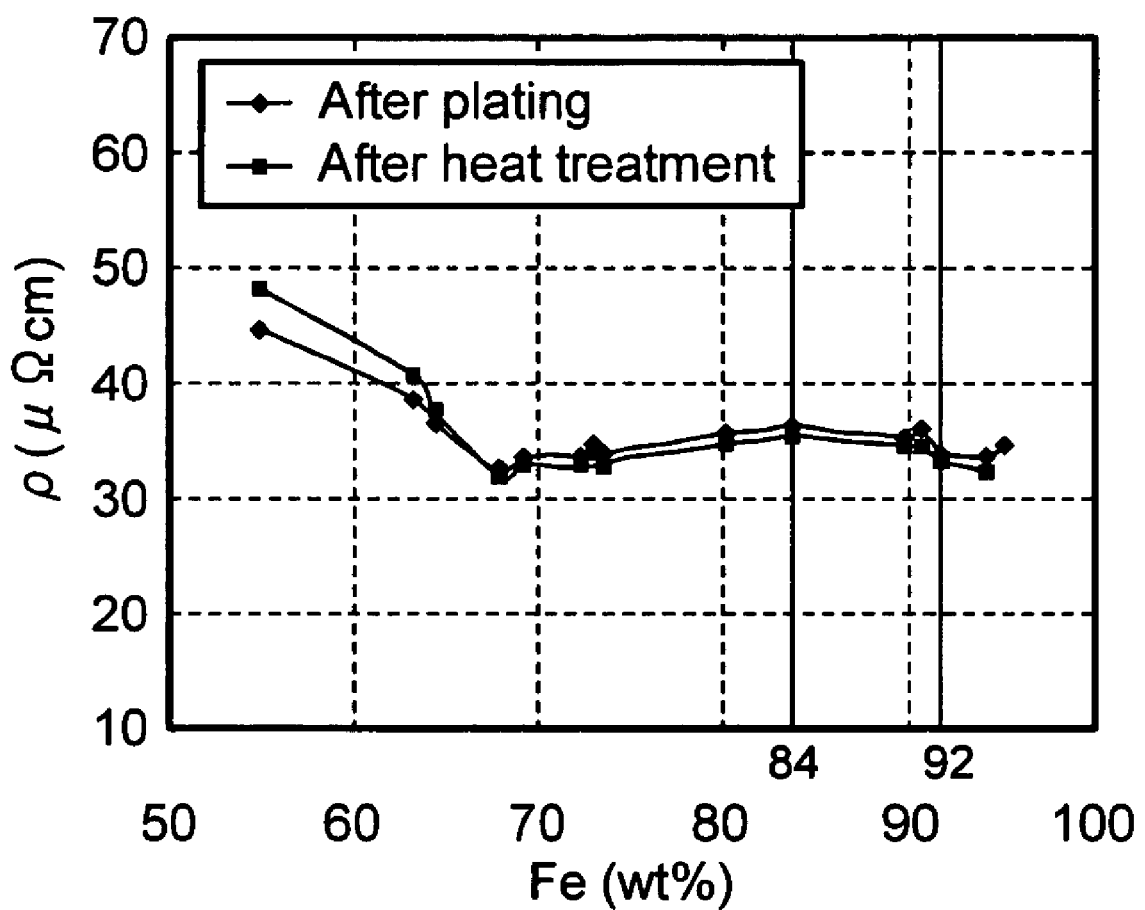
FIG. 5 is a diagram illustrating the dependence of a specific resistance p on an Fe composition in an FeNi alloy plating according to an embodiment of the present invention.

The specific resistance ρ(μΩ cm) shown in FIG. 5 decreased along with the increase in Fe, and it was found that it was 30 to 35 μΩ cm and did not depend on the Fe content at Fe≧65 wt %.

In view of the study described above, about 84 to 92 wt % is considered optimal for the Fe compositional range capable of satisfying each of the conditions of low Hc≦1.5 Oe, low Hk≦1.5 Oe, high Bs≧2.0 T, and ρ≧30 μΩ cm in order to further decrease the hysteresis loss and the eddy current loss in the high-frequency recording band of the magnetic pole portion of the thin film magnetic head. Further, the necessary condition for the plating bath pH in order to obtain bright plating uniformly in a plane with respect to an FeNi alloy with a compositional region of Fe=84 to 92 wt % is pH≦2.3 from FIG. 1. However, since configuration abnormality is encountered in a resist frame for forming the magnetic pole, or the plating underlying film (FeNi or FeNiCo) is etched at pH≦4, 1.5 pH≦2.3 can be said to be appropriate. From the foregoing, the hatched region shown in FIG. 1 is the appropriate range of the embodiment in view of the plating pH and the Fe composition.

Figure 6:
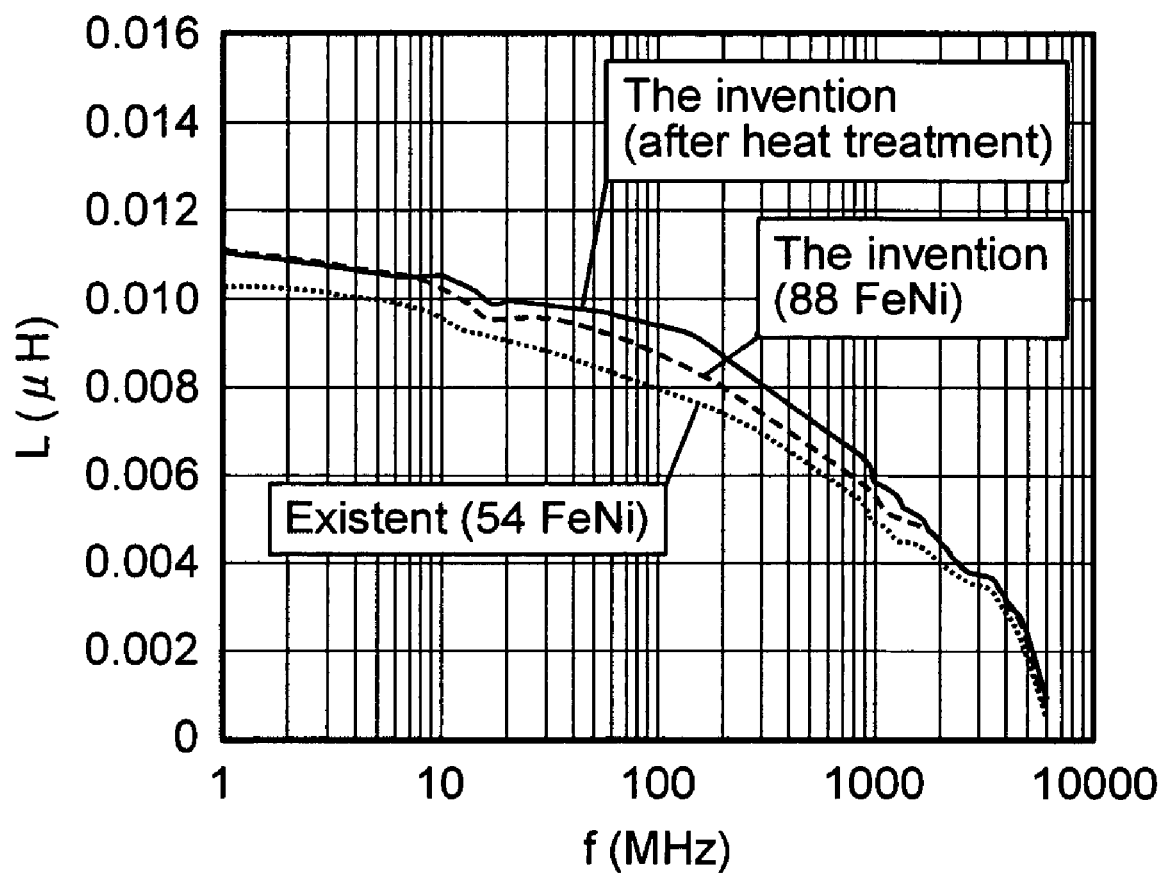
FIG. 6 is a diagram illustrating the dependence of an L characteristic on the recording frequency in a 88FeNi upper magnetic core according to an embodiment of the present invention.
Figure 9:
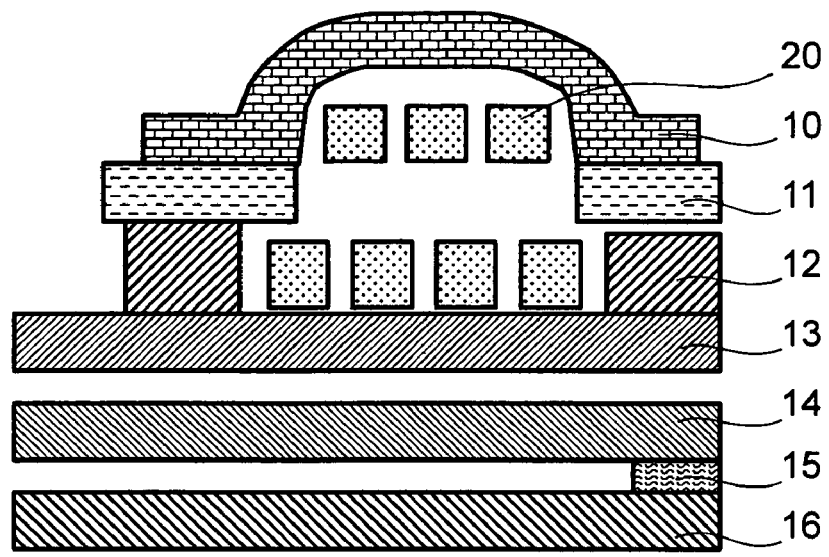
FIG. 9 is a cross-sectional view of an in-plane recording-type thin film magnetic head according to an embodiment of the present invention.

FIG. 9 shows a constitution of a thin film magnetic head. It comprises a writing portion having an upper magnetic shield 14, a GMR sensor portion 15, a lower magnetic shield 16, and a reading portion having a magnetic core 10 for an upper magnetic pole, a magnetic pole end 11 for an upper magnetic pole, a magnetic pole end 12 for a lower magnetic pole, a magnetic core 13 for the lower magnetic pole and coils 20. FeNi of about 88 wt % formed by the plating method of this embodiment is adopted for magnetic core portion 10 of the upper magnetic pole of the thin film magnetic head. FIG. 6 shows the frequency characteristic of the magnetic core. For the measurement, electric current was supplied to the coils of the thin film magnetic head in a wafer before slider fabrication and the magnetic characteristic L (μH) produced in the magnetic core was measured when the current frequency was changed. It was found, for L=0.006 μH as an evaluation index, that the current frequency increased as f=700 to 800 MHz in 88 wt % FeNi of the present embodiment from f=500 to 600 MHz in existent 54 wt % FeNi and, further, it was increased by heat treatment as f=900 to 1000 MHz. That is, the recording magnetic field does not decrease relative to the high frequency. Further, it was found that decrease of the recording magnetic field can be further suppressed by applying the heat treatment. Further, in this embodiment, while 88 wt % FeNi was applied to the magnetic core 10 of the upper magnetic pole, it may be applied not only to the entire magnetic core 10 but also to a portion of the layer region.

Figure 7:
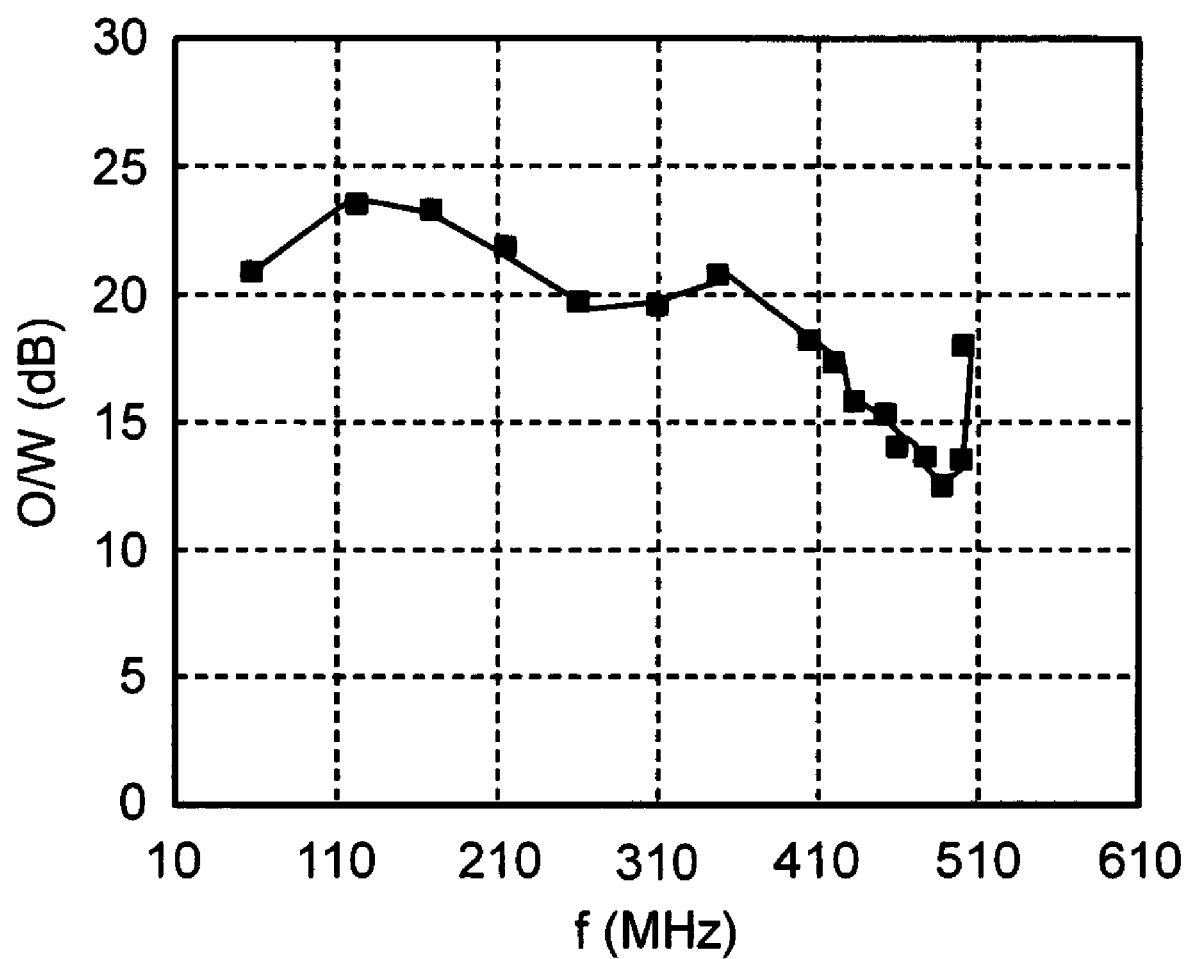
FIG. 7 is a diagram illustrating the dependence of overwrite (O/W) characteristic on the recording frequency in an existent thin film magnetic head.
Figure 8:
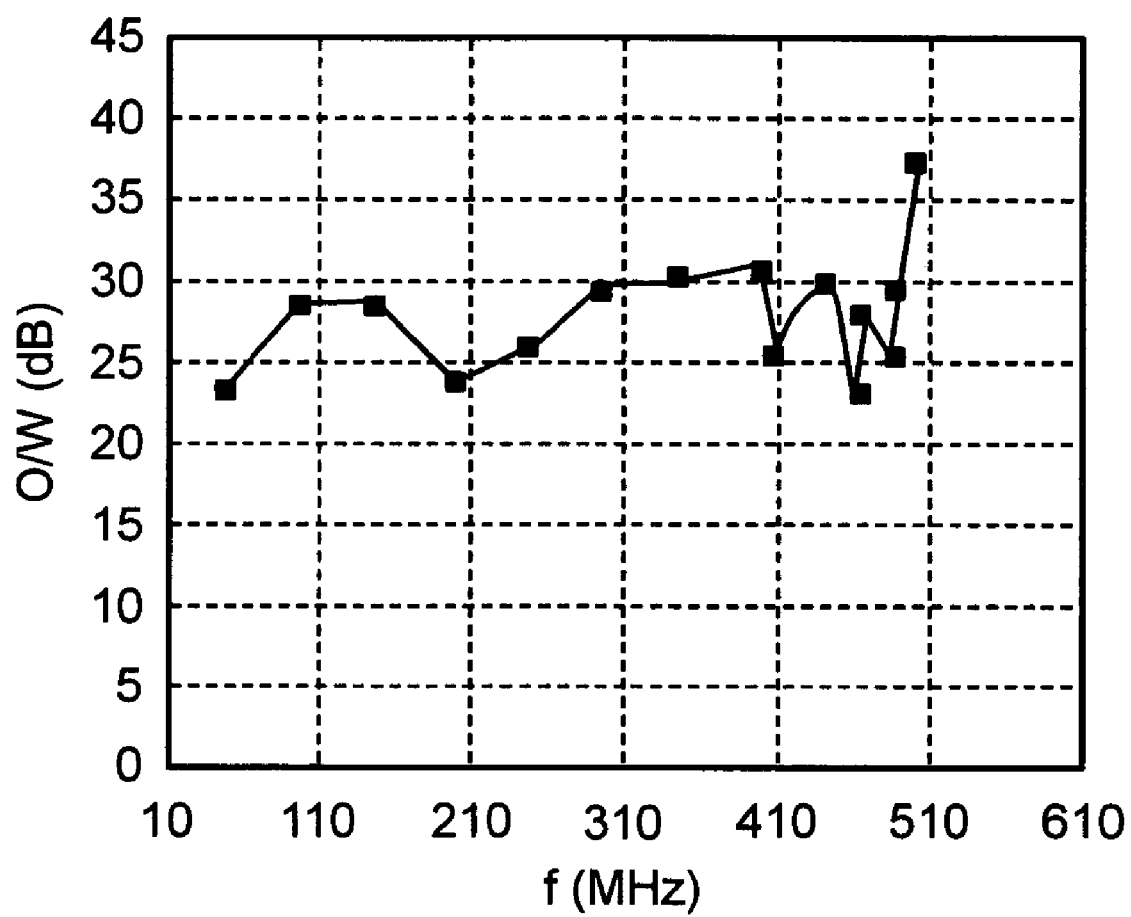
FIG. 8 is a diagram illustrating the dependence of O/W characteristic on the recording frequency in a thin film magnetic head according to an embodiment of the present invention.

Successively, the thin film magnetic head was subjected to slider fabrication; reading operation to a recording medium was performed and overwrite (hereinafter referred to as O/W) measurement expressing the reading performance was performed. FIG. 8 shows O/W relative to the recording frequency. FIG. 7 shows similar O/W to a thin film magnetic head of an existent 54 wt % FeNi magnetic core. It was measured at a recording frequency, f=50 to 500 MHz. In the existent magnetic core, O/W decreases from 20-25 dB to 10-15 dB along with an increase in the frequency. That is, the recording performance is lowered. However, in the 88 wt % FeNi magnetic core of this embodiment, O/W is not decreased even with the increase of frequency and a range of 20 to 30 dB can be maintained; that is, O/W can be generated without lowering the recording magnetic field. Further, when the thermal protrusion of the thin film magnetic head was measured, the amount of protrusion in the direction of the air bearing surface could be decreased as 15 nm relative to 19 nm in the existent thin film magnetic head, that is, a 4 mm by 4 nm decrease could be attained. This is considered to be an effect of reducing the hysteresis loss and the eddy current loss thereby decreasing the heat generation in the magnetic core portion by low Hc and low Hk (Hc≦1.5 Oe, Hk≦1.5 Oe).

In a second embodiment, a plating film of 88Fe9Ni3Co with the addition of about 3 wt % Co to the about 88 wt % FeNi film was formed. Compared with 54 wt % FeNi, the magnetic characteristic after the heat treatment could be decreased as Hc 1.1 Oe (−0.3 Oe), Hk 1.4 Oe (−3.2 Oe) and, further, Bs could be increased as from Bs 1.7 T to 2.3 T (+0.6 T) compared with 88 wt % FeNi. When the Co compositional range was studied for the range capable of satisfying each of the conditions of low Hc≦1.5 Oe, Low Hk≦1.5 Oe, high Bs≧2.0 T and ρ30 μΩ cm, it was found that this could be attained in a range of Co of about 1 to 8 wt %. In this embodiment, the 88Fe9Ni3Co film is used for magnetic pole end 11 of the upper magnetic pole and a plating under film (not illustrated) of the same composition is formed by a sputtering method at the magnetic pole end. As a result of performing the same O/W measurement, this film could obtain an effect that the frequency dependence did not lower like the 88 wt % FeNi film and, further, the O/W nominal value was increased from average 27 dB to 31 dB (+4dB). This is considered to be the effect of increasing Bs. Further, the 88 wt % Fe 9 wt % Ni 3 wt % Co film in this embodiment is within a range of the present invention not only in a case applying to the entire magnetic pole end of the upper magnetic pole but also as a structure applied to a portion of the layer. Further, the 88Fe9Ni3Co film can also be applied entirely or partially to magnetic pole end 12 of the lower magnetic pole.

In a third embodiment, a plating film of 88Fe11Ni1Cr with the addition of about 1 wt % Cr as a nonmagnetic metal to the about 88 wt % FeNi film was formed. Its addition method was that chromium chloride was dissolved and added to a plating bath. This film also had brightness and uniformity, and for the magnetic characteristic after the heat treatment, Hc could be decreased to 1.3 Oe (−0.1 Oe), Hk could be decreased to 1.5 Oe (−3.1 Oe), and Bs could be increased to 2.1 T (+0.4 T) compared with 54 wt % FeNi. While the effect of the magnetic characteristic was less than the films of embodiments 1 and 2, ρ could be increased from 35 μΩ cm to 40 μΩ cm (+5 μΩ cm) compared with the films described above. Further, the 88Fe11Ni1Cr film was used for magnetic core portion 13 of the lower magnetic pole and O/W was measured in the same manner as described above. The frequency dependence was not lowered as in the 88 wt % FeNi film and, also for the O/W nominal value, an effect at the same level of 27.3 dB could be obtained. When the 88Fe11Ni1Cr film was used for magnetic core 10 of the upper magnetic pole, a similar effect could be obtained. In this embodiment, the composition comprises 88 wt % FeNi with the addition of about 1 wt % Cr, but it may be a composition comprising 88 wt % Fe Ni 3 wt % Co with the addition of about 1 wt % Cr. Further, a similar magnetic characteristic can be obtained within a range for the amount of added Cr from about 0.5 to 1.5 wt %. Further, it was found that the magnetic characteristic capable of satisfying low Hc (Hc≦1.5 Oe), low Hk (Hk≦1.5 Oe), high Bs≧2.0 T, and ρ≧30 μΩ cm can also be obtained by an FeNi series alloy plating film or an Fe—Ni—Co series alloy plating film with the addition of at least one of Pd, Rh, Ru, Re, Mo and Ir instead of Cr in this embodiment.

In the fourth, fifth, and sixth embodiments, in view of the matching properties of a thin film magnetic head with different specifications of magnetic disk apparatuses, that is, different recording media, the 88 FeNi film described in the first embodiment is used with at least a portion of magnetic pole end 11 of the upper magnetic pole, magnetic pole end 12 of the lower magnetic pole and magnetic core portion 13 of the lower magnetic pole (fourth embodiment); the 88Fe9Ni3Co film described in the second embodiment is used with at least a portion of magnetic core 10 of the upper magnetic pole and magnetic core 13 of the lower magnetic pole (fifth embodiment); and the 88Fe11Ni1Cr film described in the third embodiment is used with magnetic pole end 11 of the upper magnetic pole and magnetic pole end 12 of the lower magnetic pole (sixth embodiment). As a result, it could be confirmed that O/W was not decreased for each of the recording media and they could be used sufficiently even in a high-frequency band region.

Figure 10:
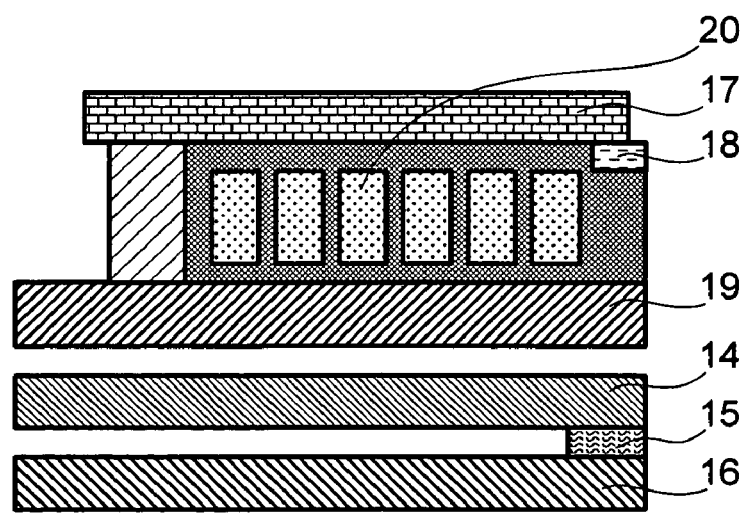
FIG. 10 is a cross-sectional view of a vertical recording-type thin film magnetic head according to an embodiment of the present invention.

In a seventh embodiment, a vertical recording-type thin film magnetic head using the present invention is shown in FIG. 10. The reading portion of the vertical recording-type thin film magnetic head has an upper yoke 17, a main magnetic pole 18, an auxiliary magnetic pole 19, and coils 20. In this embodiment, a 88 wt % FeNi film is used for the upper yoke 17 and a 88Fe11Ni1Cr film with addition of about 1 wt % Cr is used for auxiliary magnetic pole 19. As a result, it could be confirmed that O/W was not lowered and could be used sufficiently even in a high-frequency band compared with the existent vertical recording-type thin film magnetic head. Further, each of the compositional ranges can be the range as described for the first to third embodiments.

Figure 11:
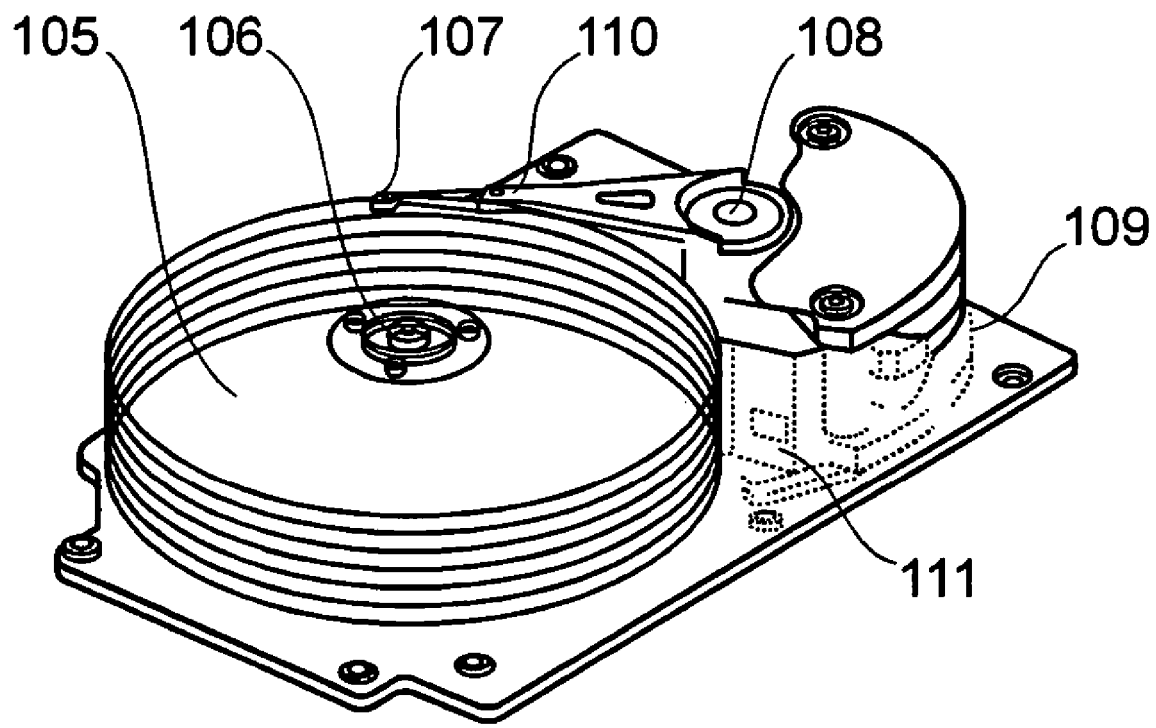
FIG. 11 is a view of a magnetic disk apparatus mounting a thin film magnetic head according to an embodiment of the present invention.

FIG. 11 shows a magnetic disk apparatus mounting the thin film magnetic head according to an embodiment of the present invention. The magnetic disk apparatus comprises a magnetic disk 105 for recording information, a motor 106 for rotating the magnetic disk, a thin film magnetic head 107 for reading or writing information to or from a film magnetic disk, an actuator 108 for positioning the magnetic head at an aimed position on the magnetic disk, and a voice coil motor 109. Further, it has a guide arm 111 for fixing a suspension 110 for stably flying a distance between the thin film magnetic head and the magnetic disk by submicron space and is driven by the actuator and the voice coil motor. Further, although not illustrated, the apparatus comprises a magnetic disk rotation control system, a head positioning control system and a read/write signal processing system.

Since the present invention can remarkably improve the reading characteristics of a thin film magnetic head and the manufacturing process thereof is similar to that of the prior art, a high-performance and high-quality magnetic disk apparatus can be provided at a reduced cost.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A thin film magnetic head, comprising:
   a lower magnetic pole having a magnetic core,
   wherein at least a portion of the magnetic core of the lower magnetic pole is made of an Fe-Ni-Co series alloy plating film with addition of a nonmagnetic metal Cr or at least one of Pd, Rh, Ru, Re, Mo and Ir, and
   wherein a film composition of the Fe-Ni-Co series alloy plating film comprises about 84-92 wt % Fe, about 1 to 3 wt % Co, and about 0.5 to 1.5 wt % nonmagnetic metal,
   wherein the Fe-Ni-Co series alloy plating film has a heat treatment in the magnetic field after plating,
   wherein an Hc of the film composition of the Fe-Ni-Co series alloy plating film is 1.5 Oe or less.

2. A thin film magnetic head according to claim 1, further comprising:
   a upper magnetic pole having a magnetic core and a magnetic pole end;
   wherein the lower magnetic pole includes a magnetic pole end, and
   wherein at least a portion of the magnetic core of the upper magnetic pole, the magnetic pole end of the upper magnetic pole, and the magnetic pole end of the lower magnetic pole comprises the Fe-Ni-Co series alloy plating film with addition of the nonmagnetic metal Cr or at least one of Pd, Rh, Ru, Re, Mo and Ir, having the film composition of about 84-92 wt % Fe, about 1 to 3 wt % Co, and about 0.5 to 1.5 wt % nonmagnetic metal.

3. The thin film magnetic head according to claim 2, wherein the Fe-Ni-Co series alloy plating film is formed by using a plating bath at a bath pH of about 1.5 to 2.3.

4. A magnetic disk apparatus on which a thin film magnetic head according to claim 1 is mounted.

5. The thin film magnetic head according to claim 1, wherein the Fe-Ni-Co series alloy plating film is formed by using a plating bath at a bath pH of about 1.5 to 2.3.

6. A thin film magnetic head according to claim 1, wherein said Fe-Ni-Co series alloy plating film is a recrystallized film.

7. A thin film magnetic head comprising:
   an upper magnetic pole having a magnetic pole end; and
   a lower magnetic pole having a magnetic pole end,
   wherein at least a portion of the magnetic pole end of the upper magnetic pole and the magnetic pole end of the lower magnetic pole near a gap comprises an Fe-Ni-Co series alloy plating film, and
   wherein a film composition of the Fe-Ni-Co series alloy plating film comprises about 84 to 92 wt % Fe and about 1 to 3 wt % Co, and wherein the Fe-Ni-Co series alloy plating film is formed by using a plating bath at a bath pH of about 1.5 to 2.3,
   wherein the Fe-Ni-Co series alloy plating film has a heat treatment in the magnetic field after plating,
   wherein an Hc of the film composition of the Fe-Ni-Co series alloy plating film is 1.5 Oe or less.

8. A thin film magnetic head according to claim 7,
   wherein the upper magnetic pole includes a magnetic core,
   wherein the lower magnetic pole includes a magnetic core, and
   wherein at least a portion of the magnetic core of the upper magnetic pole and the magnetic core of the lower magnetic pole comprises the Fe-Ni-Co series alloy plating film having the film composition of about 84 to 92 wt % Fe and about 1 to 3 wt % Co.

9. A magnetic disk apparatus on which a thin film magnetic head according to claim 7 is mounted.

10. A thin film magnetic head according to claim 7, wherein said Fe-Ni-Co series alloy plating film is a recrystallized film.

* * * * *